United States Patent
Su

(10) Patent No.: US 6,856,954 B1
(45) Date of Patent: Feb. 15, 2005

(54) FLEXIBLE VARIABLE RATE VOCODER FOR WIRELESS COMMUNICATION SYSTEMS

(75) Inventor: Huan-Yu Su, San Clemente, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 500 days.

(21) Appl. No.: 09/627,375

(22) Filed: Jul. 28, 2000

(51) Int. Cl.⁷ .............................................. G10L 19/00
(52) U.S. Cl. ...................... 704/212; 704/221; 370/252; 370/335; 455/406
(58) Field of Search .............................. 704/221, 212, 704/209, 233, 275; 455/406, 407; 370/252, 335; 379/114.12

(56) References Cited

U.S. PATENT DOCUMENTS

| | | | | |
|---|---|---|---|---|
| 5,414,796 A | * | 5/1995 | Jacobs et al. ............... | 704/221 |
| 5,914,950 A | * | 6/1999 | Tiedemann et al. ......... | 370/348 |
| 6,002,933 A | * | 12/1999 | Bender et al. .............. | 455/442 |
| 6,047,326 A | * | 4/2000 | Kilkki ........................ | 709/228 |
| 6,073,101 A | * | 6/2000 | Maes .......................... | 704/275 |
| 6,205,125 B1 | * | 3/2001 | Proctor et al. .............. | 370/328 |
| 6,335,922 B1 | * | 1/2002 | Tiedemann et al. ......... | 370/335 |
| 6,347,224 B1 | * | 2/2002 | Smyth et al. ............... | 455/406 |
| 6,351,495 B1 | * | 2/2002 | Tarraf ......................... | 375/259 |
| 6,374,112 B1 | * | 4/2002 | Widegren et al. ......... | 455/452.2 |
| 6,418,147 B1 | * | 7/2002 | Wiedeman ................... | 370/468 |
| 6,426,971 B1 | * | 7/2002 | Wu et al. .................... | 375/227 |
| 6,445,696 B1 | * | 9/2002 | Foodeei et al. ............. | 370/356 |
| 6,453,291 B1 | * | 9/2002 | Ashley ........................ | 704/233 |
| 6,463,274 B1 | * | 10/2002 | Robertson ................... | 455/406 |
| 6,487,394 B1 | * | 11/2002 | Ue et al. ...................... | 455/69 |
| 6,501,736 B1 | * | 12/2002 | Smolik et al. .............. | 370/252 |
| 6,505,035 B2 | * | 1/2003 | Ue et al. ...................... | 455/69 |

OTHER PUBLICATIONS

DeJaco, Andy; *Test Plan and Requirements of the Selectable Mode Vocoder*; Voice Band Signal Processing Roup, Qualcomm CDMA Technology (QCT) Division; Qualcomm Inc., Version 8.0; Lake Louise, Alberta Canada, Oct. 12–14, 1999; 45 pages.

* cited by examiner

Primary Examiner—Richemond Dorvil
Assistant Examiner—Qi Han
(74) Attorney, Agent, or Firm—Farjami & Farjami LLP

(57) ABSTRACT

A flexible variable rate vocoder and related method of operation. The vocoder selects a target average data rate responsive to at least one network parameter and at least one external parameter.

7 Claims, 4 Drawing Sheets

FLEXIBLE VARIABLE RATE VOCODER FOR WIRELESS COMMUNICATION SYSTEMS

BACKGROUND OF THE INVENTION

1. Field of the Invention

This invention generally relates to speech vocoders, and, more specifically, to flexible variable rate vocoders for wireless communication systems.

2. Background

In digital wireless communications systems, a speech vocoder is the device which compresses the digitized the speech signals prior to communication thereof over the wireless channel. Many different compression schemes for speech signals are currently used, including PCM (pulse code modulation), ADPCM (adaptive differential pulse code modulation), and EVRC (Enhanced Variable Rate-Coder). At present, the rate at which a vocoder functions is subject to constraints imposed by the network designer.

For example, in current commercial CDMA (code division multiple access) systems, the rate at which the vocoder functions is limited to four possible rates: full rate, half rate, quarter rate, or eight rate. At full rate, speech is encoded at 170 bits per frame, at half rate, 80 bits per frame, at quarter rate, 40 bits per frame, and at eighth rate, 16 bits per frame. With a 20 ms frame duration, these figures translate into a rate of 8.5 kbit/sec. for full rate, 4 kbit/sec. for half rate, 2 kbit/sec. for quarter rate, and 0.8 kbit/sec. for eighth rate. The rate which is chosen at a time depends on the level of speech activity. For a high level of activity, the full rate is chosen, while for no activity (e.g. silence background), the eighth rate is chosen. For intermediate levels of activity, the half or quarter rates are chosen. Rates greater than 8.5 kbits/sec. or less than 0.8 kbits/sec. are not possible. Since the bit-rate for a particular speech signal varies depending upon the nature of that speech signal, only the average bit-rate is of interest. The average bit-rate is also called average data-rate (ADR).

Recently, a proposal has been made for a selectable mode vocoder (SMV) which is capable of operating in one of three modes. See Test Plan and Requirements of the Selectable Mode Vocoder, version 8.0, 3GPP2-C13-19991912-007R1, which is hereby fully incorporated by reference herein as though set forth in full. In mode 0, the target ADR of the vocoder is the same as the EVRC (Enhanced Variable Rate Vocoder) rate defined in IS-127 standard. In mode 1, the target ADR is roughly 0.7 that of the EVRC. In mode 2, the target ADR is 0.55–0.6 that of the EVRC, depending on the input signal characteristics, such as speech without background noise or speech with background noises. It is contemplated that the mode of operation of a SMV will be determined by the operator based upon the tradeoff between the network capacity which is available in the system and the desired quality of service.

A problem with this approach is that, if the network cannot accommodate a demand for services at the desired level of quality, the user will be denied access to the system. Consider, for example, a user who is seeking access to the system in the case in which the network is near saturation. If the desired level of speech activity requires mode 0, and mode 0 cannot be accommodated by the system, the user will be denied access to the system.

A related problem is loss of flexibility due to the limited number of discrete modes of operation which are available.

As detailed above, this loss of flexibility results in users who are denied access to the system. It will also result in lost profit opportunities as there may be users willing to pay for a higher quality of service than available in the limited number of discrete modes of operation.

SUMMARY OF THE INVENTION

In accordance with one aspect of the invention as broadly described herein, there is provided a flexible variable rate vocoder comprising a rate determination module which selects a target average data rate from a continuous or pseudo-continuous range of possible target rates responsive to at least network parameter and at least one external parameter, and a rate implementation module which sets the rate of outgoing frames so that the actual rate averaged over a predetermined time period is approximately equal to the target average data rate.

In one embodiment, the rate implementation module sets the rate of outgoing frames by adjusting the relative percentages of outgoing frames which are full rate, half rate, quarter rate, and eighth rate frames such that the average actual rate is approximately equal to the target average rate.

In one implementation, the network parameter is available network capacity, and the external parameter is an indicator of the class of service desired or purchased by a user. In one implementation example, the available classes of service comprise premium, standard, and economy. When a demand for network services is received, a determination is made if the network can accommodate the demand at the desired quality. If the network cannot accommodate the demand at the desired quality, the network will reduce the ADR of all non-premium users until the network can accommodate the demand at the desired quality. If the network can easily accommodate the demand at the desired quality, the network will do so and may then even increase the ADR of all users until the network is close to saturation. In this implementation, the ADR of a premium user starts out at a relatively high rate and remains so despite subsequent changes in demand for network resources. The ADR of a standard user starts out at a relatively moderate rate, and then changes over time with subsequent changes in demand for network resources. The ADR of an economy user starts out relatively low, and then changes over time with subsequent changes in demand for network resources.

In another implementation, the network parameter is available capacity, and the external parameter is an indicator of the subject matter of the information sought to be transmitted. In one implementation example, the available classes of subject matter which can be transmitted comprise voice, data, music, or video. When a demand for network services is received, a determination is made whether the network can accommodate the additional demand at the desired quality. If the network cannot do so, it will reduce the ADR for selected categories of subject matter, i.e., music, until the network can accommodate the demand at the desired quality. If the network can easily accommodate the desired demand, it will do so, and may even increase the ADR for selected categories of subject matter, e.g., voice and data.

In other implementation examples, the external parameter may be the time of day, the weather, etc. Related methods of operation are also provided.

DETAILED DESCRIPTION OF THE PREFERRED EMBODIMENTS

Figure 3:
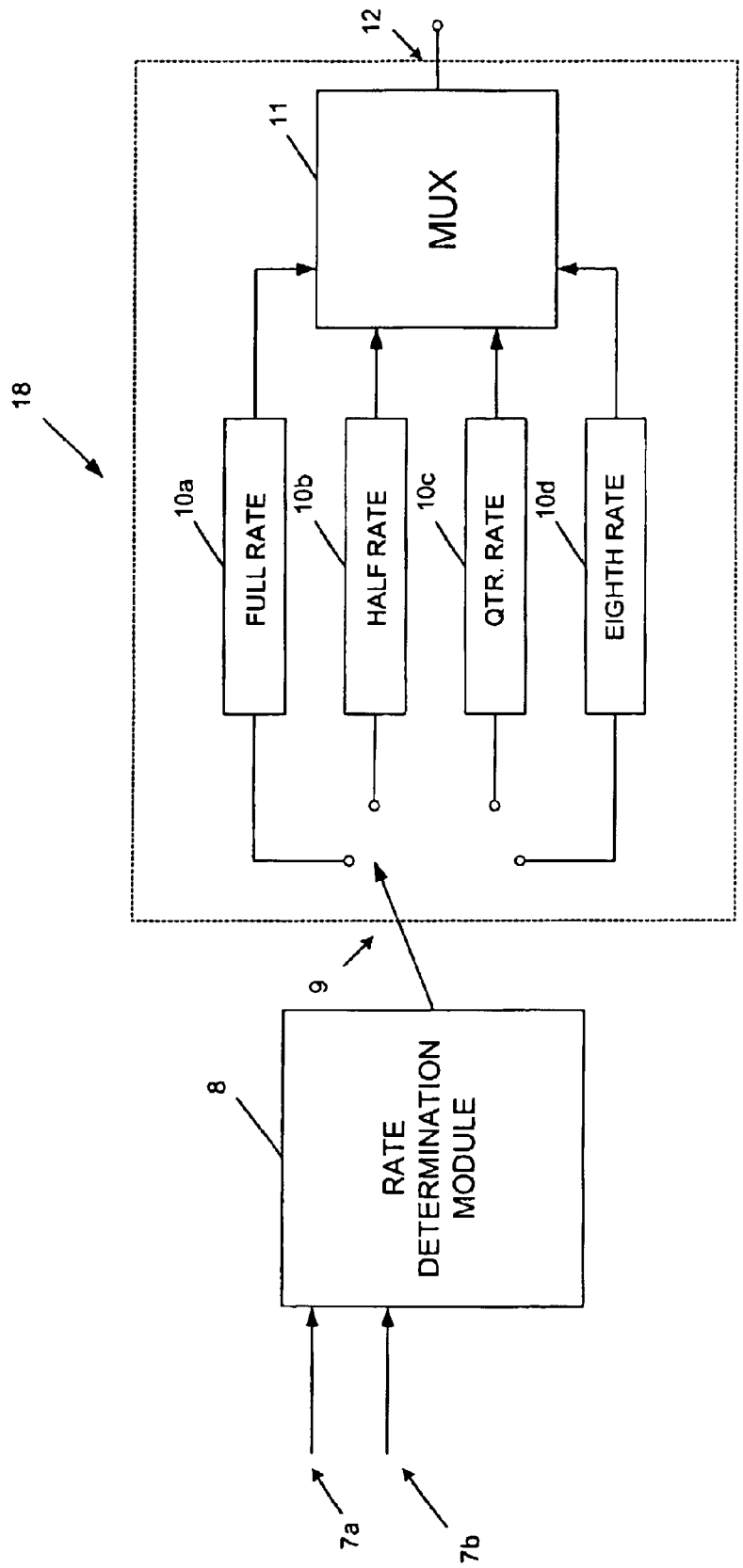
FIG. 3 illustrates an embodiment of a flexible variable rate vocoder in accordance with the subject invention.

An embodiment of a flexible variable rate vocoder in accordance with the subject invention is illustrated in FIG. 3. As illustrated, in this embodiment, the vocoder includes a rate determination module 8 which selects a target average data rate from a continuous or pseudo-continuous range of possible target rates responsive to at least network parameter 7a and at least one external parameter 7b, and a rate implementation module 18 which sets the rate of outgoing frames so that the actual rate averaged over a predetermined time period is approximately equal to the target average data rate.

For purposes of this disclosure, the term "pseudo-continuous" for a range of modes or parameters means a set of discrete range of modes or parameters that are fine enough to approximate a continuous range of the modes or parameters.

In one implementation, the rate implementation module 18 sets the rate of outgoing frames by adjusting the relative percentages of outgoing frames which are full rate, half rate, quarter rate, and eighth rate frames such that the average actual rate is approximately equal to the target average rate. In this implementation, the rate implementation module 18 comprises switch 9, full rate module 10a, half rate module 10b, quarter rate module 10c, eighth rate module 10d, and multiplexor 11. The multiplexor 11 receives the frames from each of the modules 10a, 10b, 10c, 10d, and serially outputs them on signal line 12.

In other implementations, the rate implementation module 18 is not limited to setting the relative percentages of frames which are full rate, half rate, quarter rate, and eighth rate. For instance, the ITU has standardized a G.729 Annex I where five coding rates are used: 11.2 kbit/sec., 8 kbit/sec., 6.4 kbit/sec., 1.5 kbit/sec., and 0 kbit/sec. Implementations are possible in which the rate implementations module 18 sets the relative percentages of frames which are within these five coding rates. In addition, implementations are possible in which the rate implementation module 18 sets the relative percentages of frames which are within the eight coding rates which are available in the GSM Adaptive Multi-Rate (AMR) coding system.

In one implementation, the network parameter is available network capacity, and the external parameter is an indicator of the class of service desired or purchased by a user. In one implementation example, the available classes of service comprise premium, standard, and economy. When a demand for network services is received, a determination is made if the network can accommodate the demand at the desired quality. If the network cannot accommodate the demand at the desired quality, the network will reduce the ADR of all non-premium users until the network can accommodate the demand at the desired quality. If the network can easily accommodate the demand at the desired quality, the network will do so and may then even increase the ADR of all users until the network is close to saturation.

In this implementation, the ADR of a premium user starts out at a relatively high rate, and remains so despite subsequent changes in demand for network resources. The ADR of a standard user starts out at a relatively moderate rate, and then changes over time with subsequent changes in demand for network resources. The ADR of an economy user starts out relatively low, and then changes over time with subsequent changes in demand for network resources.

Figure 1:
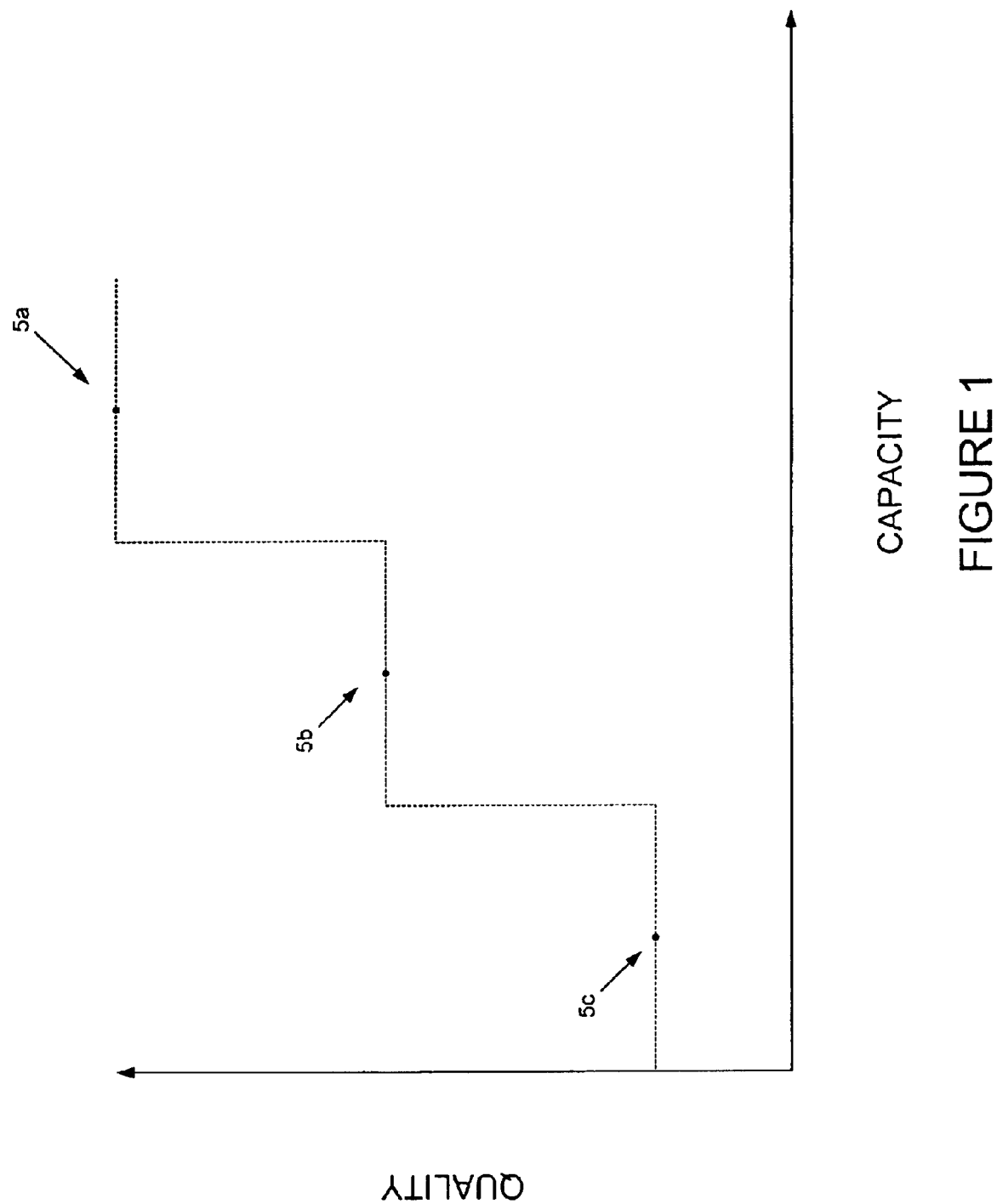
FIG. 1 illustrates the discrete quality of service/capacity tradeoff options which are available in a conventional network.
Figure 2:
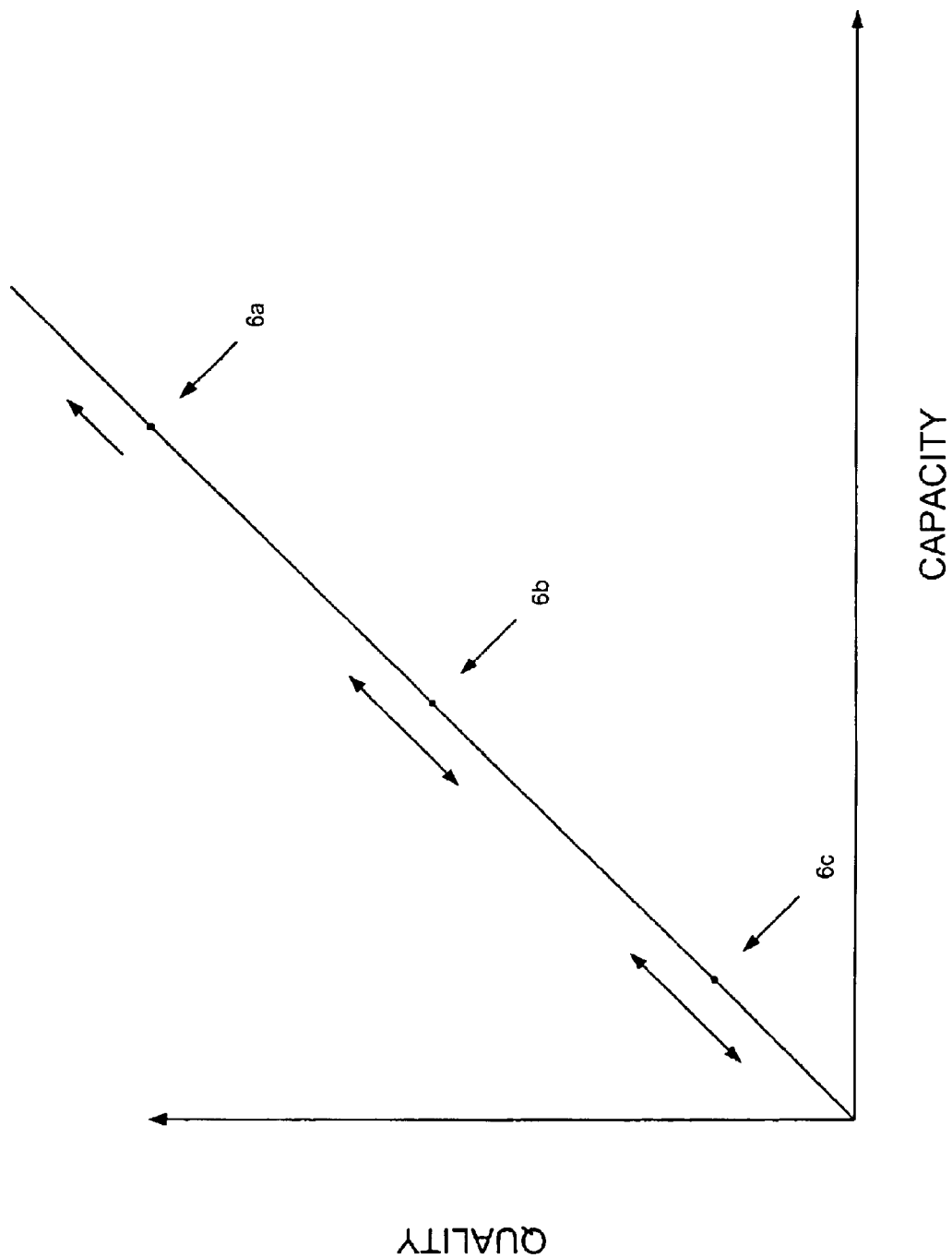
FIG. 2 illustrates the continuous or pseudo-continuous quality of service/capacity tradeoff options which are available in a network configured in accordance with the subject invention.

The quality of service/capacity tradeoffs which are available in this implementation can be represented by the curve 6 in FIG. 2. The initial quality of service/capacity tradeoff represented by the premium class of service might be represented by numeral 6a; that for the standard class of service, by numeral 6b; and that for the economy class of service, by numeral 6c. As changes in the demand for network services occur, a premium user can move upwards along the curve, but never downwards. The standard user can move upwards or downwards. The economy user can move upwards or downwards. These movements are represented by the arrows in FIG. 2. Because of these movements, the entirety of the curve 6 in FIG. 2 can be traversed. The result is that a continuous or pseudo-continuous range of quality of service/capacity tradeoffs will be made available to the user.

Compared to the prior art SMV vocoder, an advantage of the vocoder of FIG. 3 is reduction in the number of users denied access to the system. Consider a system which is near saturation at the time a user requests access to the system. If the system cannot accommodate the desired level of quality of service, and existing users have already been downgraded to mode 2, the user will be denied access to the system. In a system of the subject invention, however, the ADRs of non-premium users will be downgraded until the system can accommodate the new user. Of course, if the user is a non-premium user as well, the ADR assigned to this user will be downgraded as well from its initial nominal value along with all the other non-premium users.

Compared to the prior art system, another advantage is the ability to accommodate users which desire a higher quality of service that available through mode 0. In the conventional system, such a mode of service is unavailable. In the system of the subject invention, however, such a class of service could be made available.

In another implementation, the network parameter is available capacity, and the external parameter is an indicator of the subject matter of the information sought to be transmitted. In one implementation example, the available classes of subject matter which can be transmitted comprise voice, data, music, or video. When a demand for network services is received, a determination is made whether the network can accommodate the additional demand at the desired quality. If the network cannot do so, it will reduce the ADR for selected categories of subject matter, i.e., music, until the network can accommodate the demand at the desired quality. If the network can easily accommodate the desired demand, it will do so, and may even increase the ADR for selected categories of subject matter, e.g., voice and data.

In other implementation examples, the external parameter may be the time of day, the weather, etc.

Figure 4:
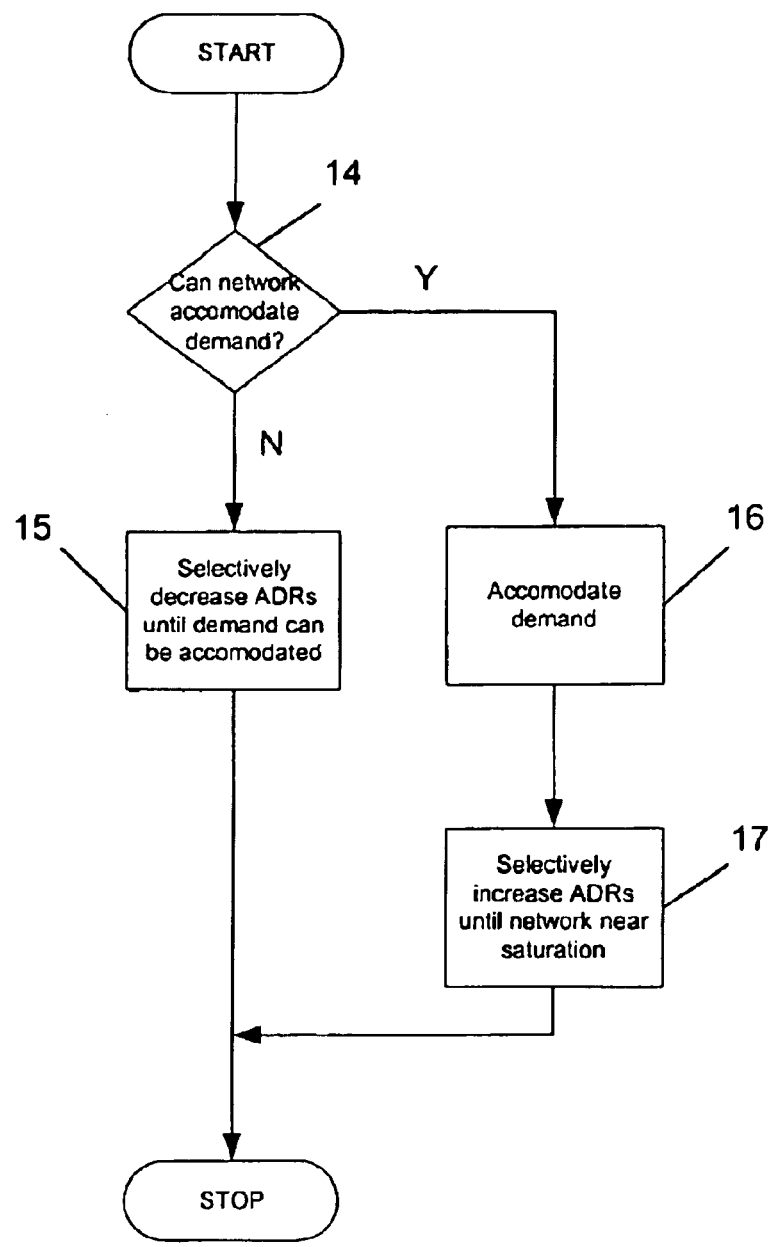
FIG. 4 illustrates an embodiment of a method of operation in accordance with the subject invention.

An embodiment of a method of operation in accordance with the subject invention is illustrated in FIG. 4. The process begins when a demand for network services is initiated. In one implementation, the demand includes a desired level of quality, e.g., premium, standard, or economy. In another implementation, the demand includes a category of subject matter sought to be transmitted, e.g., voice, data, music, image, video, audio, etc., each of which is associated, through one or more lookup tables, with a desired level of quality. The process proceeds to task 14, in which it is queried whether the network can accommodate the demand at the desired level of quality. If not, the process proceeds to step 15, which comprises selectively decreasing the ADRs of existing users (and typically the new user as well) until the demand can be accommodated at the desired quality of service. In one implementation, this step occurs by decreasing the ADRs of non-premium users. In another implementation, this step occurs by decreasing the ADRs of selected categories of subject matter, e.g., music and data. Turning back to task 14, is the demand can be accommodated at the desired level of quality, task 16 is performed. Task 16 comprises accommodating the demand at the desired level of quality. Optional step 17 is then performed which comprises selectively increasing the ADRs of existing users (and typically the new user as well) until the network loading is within a predetermined amount, e.g., 10%, from saturation. In one implementation, this step occurs by increasing the ADRs of all users. In another implementation, it occurs by increasing the ADRs of selected classes of users, e.g., premium and standard users. In yet another implementation, it occurs by increasing the ADRs of selected categories of subject matter, e.g., voice and data.

The vocoder of the subject invention may be included within a transceiver, transmitter, or receiver which in turn may be included in a wireless device, including a mobile wireless device such as a handset, or an immobile wireless device, such as a television set-top box.

While embodiments, implementations, and implementation examples have been shown and described, it should be appreciated that there are many more embodiments, implementations, and implementation examples that are within the scope of the subject invention. Accordingly, the subject invention is not to be restricted, except in light of the appended claims and their equivalents.

What is claimed is:

1. A flexible variable rate vocoder for use in a network to process signals, the vocoder having a plurality of output rates and a plurality of service classes the vocoder comprising:

a rate determination module configured to select a target average data rate based on at least one network parameter and at least one external parameter, wherein one of the at leant one network parameter is indicative of an available network capacity; and a rate implementation module configured to select between the plurality of output rates for coding outgoing frames of the signals to achieve an average output rate for the outgoing frames, as determined over a predetermined time period, wherein the average output rate is approximately equal to the target average data rate;

wherein the plurality of service classes comprise a premium class, a standard class and an economy class, and wherein the network has a plurality of users, each user of the plurality of users having a desired service class from the plurality of service classes and wherein if the network cannot accommodate a service demand by one of the plurality of users, the target average data rates associated with the standard class and the economy class are reduced to accommodate the service demand and the target average data rate associated with the premium class is maintained, and wherein the service demand is determined based on the desired service class of the one uses and wherein relative percentages of the plurality of output rates are adjusted to achieve the average output rate that is approximately equal to the target average data rate.

2. The vocoder of claim 1, wherein the plurality of output rates include a full rate, a half rate, a quarter rate, and a eighth rate.

3. The vocoder of claim 2, wherein the rate implementation module comprises a switch, a full rate module, a half rate module, a quarter rate module, an eighth rate module, and a multiplexor, and wherein the switch selects between the modules for coding each of the outgoing frames, and the multiplexor receives the outgoing frames from each of the modules and serially outputs the outgoing frames on a single line.

4. The vocoder of claim 1, wherein a one of the at least one external parameter is indicative of one of the plurality of service classes.

5. A method for use by a flexible variable rate vocoder in a network to process signals, the vocoder having a plurality of output rates and a plurality of service classes the method comprising:

selecting a target average data rate based on at least one network parameter and at least one external parameter, wherein the at least one network parameter is indicative of an available network capacity; and selecting between the plurality of output rates for coding outgoing frames of the signals to achieve an average output rate for the outgoing frames, as determined over a predetermined time period, wherein the average output rate is approximately equal to the target average data rate;

wherein the plurality of service classes comprise a premium class, a standard class and an economy class; and wherein the network has a plurality of users, each user of the plurality of users having a desired service clam from the plurality of service classes, and wherein the method further comprising: determining that the network cannot accommodate a service demand by one of the plurality of users; reducing the target average data rates associated with the standard class and the economy class to accommodate the service demand; and maintained the target average data rate associated with the premium wherein the service demand is determined based on the desired service class of the one use and adjusting relative percentages of the plurality of output rates to achieve the average output rate that is proximately equal to the target average data rate.

6. The method of claim 5, wherein the plurality of output rates include a full rate, a half rate, a quarter rate, and a eighth rate.

7. The method of claim 5, wherein one of the at least one external parameter is indicative of one of the plurality of service classes.

* * * * *